(12) United States Patent
Letz et al.

(10) Patent No.: US 8,772,188 B2
(45) Date of Patent: Jul. 8, 2014

(54) GLASS-CERAMIC HAVING AT LEAST TWO CRYSTAL PHASES, PROCESS FOR PRODUCING A GLASS-CERAMIC AND ITS USE

(75) Inventors: Martin Letz, Mainz (DE); Stephan Knoener, Herford (DE); Martina Dressler, Mainz (DE); Daniela Seiler, Alzey (DE); Bernd Hoppe, Ingelheim (DE); Michael Kluge, Offenbach a. M. (DE)

(73) Assignee: Schott AG, Mainz (DE)

( * ) Notice: Subject to any disclaimer, the term of this patent is extended or adjusted under 35 U.S.C. 154(b) by 0 days.

(21) Appl. No.: 13/417,540

(22) Filed: Mar. 12, 2012

(65) Prior Publication Data

US 2013/0237400 A1 Sep. 12, 2013

(51) Int. Cl.
*C03C 10/02* (2006.01)
*C03C 10/04* (2006.01)

(52) U.S. Cl.
USPC .............................................. 501/10; 501/5

(58) Field of Classification Search
USPC ...................................................... 501/5, 10
See application file for complete search history.

(56) References Cited

U.S. PATENT DOCUMENTS

| | | | |
|---|---|---|---|
| 6,184,845 B1 | 2/2001 | Leisten et al. | |
| 7,365,036 B2 * | 4/2008 | Miyazaki et al. | 501/10 |
| 7,910,505 B2 * | 3/2011 | Seneschal-Merz et al. | 501/10 |
| 8,039,407 B2 * | 10/2011 | Seneschal-Merz et al. | 501/10 |
| 2007/0063902 A1 | 3/2007 | Leisten | |
| 2007/0225144 A1 * | 9/2007 | Miyazaki et al. | 501/10 |
| 2007/0281851 A1 * | 12/2007 | Seneschal-Merz et al. | 501/10 |
| 2011/0028298 A1 * | 2/2011 | Hoppe et al. | 501/10 |

FOREIGN PATENT DOCUMENTS

| | | |
|---|---|---|
| DE | 102010012524 | 2/2012 |
| JP | 2011195440 | * 11/2011 |

OTHER PUBLICATIONS

English Translation of Office Action dated Apr. 1, 2011 corresponding to German Patent Application No. 102010032982.7-45.
Office Action dated Apr. 1, 2011 corresponding to German Patent Application No. 102010032982.7-45.
Takahashi, J., et al., "Microwave Deilectric Properties of Lanthanide Titanate Ceramics," Jpn. J. Appl. Phys., vol. 32 (1993), pp. 4327-4331, Part 1, No. 9B, Sep. 1993.
Mirsaneh, M., et al., "Circularly Polarized Dielectric-Loaded Antennas: Current Technology and Future Challenges," Adv. Funct. Mater., 2008, 18, pp. 1-8.
Sebastian, M. T., et al., "Low loss dielectric materials for LTCC applications: a review;" 2008 Institute of Materials, Minerals and Mining and ASM International, 2008, vol. 53, No. 3, pp. 57-90.

* cited by examiner

*Primary Examiner* — Karl Group
(74) *Attorney, Agent, or Firm* — Ohlandt, Greeley, Ruggiero & Perle, LLP

(57) ABSTRACT

A glass-ceramic having at least two crystal phases, wherein at least one crystal phase has a positive temperature dependence of the resonance frequency $\tau_{f}$, at least one crystal phase has a negative temperature dependence of the resonance frequency $\tau_f$ and the glass-ceramic has a resulting temperature dependence of the resonance frequency $\tau_f$ of 0 ppm/K with a maximum deviation of +/−20 ppm/K, is described. Furthermore, a process for producing such a glass-ceramic and the use of the glass-ceramic are described.

14 Claims, 3 Drawing Sheets

GLASS-CERAMIC HAVING AT LEAST TWO CRYSTAL PHASES, PROCESS FOR PRODUCING A GLASS-CERAMIC AND ITS USE

BACKGROUND OF THE INVENTION

1. Field of the Invention

The invention relates to a glass-ceramic having at least two crystal phases which can be employed, in particular, as dielectric in the high-frequency range (frequency>200 MHz), in particular in the gigahertz range (frequency f>1 GHz). The invention further relates to a process for producing a glass-ceramic having at least two crystal phases and to its use.

2. Description of Related Art

Specific materials which have a very high relative permittivity $\in$ at a very low dielectric loss (tan δ) are required for a series of applications in the high-frequency range. To avoid detuning by the body of a user in close proximity, known as "body loading", dielectric charging of antennae, filters and other devices is of particular importance. Here, it is necessary to have dielectrics which have a high relative permittivity of $\in \geq 15$ and a low dielectric loss (tan δ) of not more than $10^{-2}$ and preferably lower in the high-frequency range. Furthermore, the temperature dependence of the resonance frequency $\tau_f$ should be very low. Finally, such a material should be able to be processed in a very simple and inexpensive way in order to make it possible to obtain near net shape cheaply.

A glass-ceramic system is essentially known from the prior art. This is a $BiNbO_4$ system which is disclosed in Mirsaneh et al., "Cirularly Polarized Dielectric-Loaded Antennas: Current Technology and Future Challanges", Adv. Funct. Materials 18, (2008), pp. 2293-2300, for use in dielectrically loaded antennae for the gigahertz range. This material can be used for producing the two forms of antennae which are mainly used, viz. circularly polarized DLA helix antennae (D-LQH antennae) and square patch antennae. For this purpose, a glass having the composition 30 mol % of $Bi_2O_3$, 30 mol % of $Nb_2O_5$, 30 mol % of $B_2O_3$ and 10 mol % of $SiO_2$ is firstly melted in the conventional way at 1250° C. for two hours. This glass was poured into cylindrical molds, annealed at 500-520° C. and slowly cooled to room temperature. This was followed by crystallization at various temperatures in the range from 600° C. to 1000° C. In the case of a heat treatment at 960° C., a relative permittivity $\in$ of 15 with a quality factor $Q \cdot f_o$ of 15 000 GHz and a temperature coefficient of the resonance frequency $\tau_f$ of −80 ppm/K is reported as optimal value for antenna applications. Mainly orthorhombic $BiNbO_4$ was characterized as crystalline phase here.

Glass-ceramics having at least one mixed crystal phase are known as dielectric in the high-frequency range from the patent application DE 10 2010 012 524.5-45. The glass-ceramics have at least the following constituents (in mol % on an oxide basis):

| | |
|---|---|
| $SiO_2$ | 5-50 |
| $Al_2O_3$ | 0-20 |
| $B_2O_3$ | 0-25 |
| BaO | 0-25 |
| $TiO_2$ | 10-60 |
| $RE_2O_3$ | 5-35, | where Ba can be partly, preferably to an extent of up to 10%, replaced by Sr, Ca, Mg, where RE is lanthanum, another lanthanide or yttrium and where Ti can be partly, preferably to an extent of up to 10%, replaced by Zr, Hf, Y, Nb, V, Ta. The absolute value of the temperature dependence of the resonance frequency $\tau_f$ of these glass-ceramics is preferably not more than 200 ppm/K, preferably not more than 50 ppm/K, particularly preferably not more than 10 ppm/K.

In addition, there is a series of sintered ceramic materials (cf. U.S. Pat. No. 6,184,845 B1, US 2007/063902 A1). Here, a sintered ceramic material based on zirconate titanate or based on tin zirconate titanate having a relative permittivity of about 36 is reported as dielectric material for the ceramic core of a dielectrically charged D-LQH antenna. The material is said to be produced by extrusion or pressing and subsequent sintering.

Further sintered materials are reported in the article by M. T. Sebastian et al., "Low loss dielectric materials for LTCC applications", International Materials Reviews, Vol. 53 (2008), pp. 57-90. Even though these materials are sometimes referred to as "glass-ceramics", they are sintered materials since they have been produced by sintering of a mixture of vitreous and crystalline powders and not by ceramicization of a starting glass.

Dielectrics produced by sintering have a series of disadvantages: for instance, every sintering process is always associated with a certain shrinkage which leads to geometric inaccuracies and corresponding final machining. Furthermore, every sintering process leaves a certain residual porosity which is disadvantageous in the case of metallization of the surface. The metal penetrates into the pores and increases the dielectric loss of the dielectric.

In addition, the production of sintered materials is fundamentally relatively complicated and expensive.

Furthermore, La—Ti oxide compounds which have a low dielectric loss (tan δ) have been described by: J. Takahashi et al., Jpn. J. Appl. Phys, 32, 4327 (1993). These materials are characterized by their dielectric function $\varepsilon$, which is usually made up of a large real part $\varepsilon'$ and a small imaginary part $\varepsilon''$. In the GHz spectral range, the dielectric loss (tan δ) is characterized by a dimensionless quality factor Q, $Q=\varepsilon'/\varepsilon''=1/\tan \delta$, or by the Q factor multiplied by the frequency, $Q \cdot f$, which is usually reported in GHz.

A further possible way of characterizing the material is to determine the temperature dependence of the resonance frequency $\tau_f$ in the GHz range, which indicates the change in the resonance frequency at a particular material geometry as a function of the temperature. When $f_0$ is the resonance frequency at a particular material geometry, the temperature dependence of the resonance frequency in the vicinity of room temperature can be expressed as follows: $f_0(T) \approx f_0(T_{RT}) + \tau_f(T-T_{RT})$ where $\tau_f$ is defined as follows $$\tau_f = \frac{1}{f_0} \cdot \frac{\partial f_0}{\partial T}\bigg|_{T=T_{RT}}.$$

A resonance structure, e.g. a filter or an antenna, made of a material which has no temperature dependence of the resonance frequency $\tau_f$ in the GHz range ($\tau_f \approx 0$) accordingly displays no change in its resonance frequency at changing ambient temperatures.

To achieve this in the case of ceramic materials, ceramic starting components having opposite signs of the temperature dependence of the resonance frequencies $\tau_f$ are mixed and balanced so that the resulting ceramic material has $\tau_f \approx 0$ (J. Takahashi et al., Jpn. J. Appl. Phys, 32, 4327 (1993)). Here, it is proposed that the starting components 10 mol % of $La_2Ti_2O_7$ and 90 mol % of $La_4Ti_9O_{24}$ be mixed so that the ceramic material produced therefrom has $\tau_f \approx 0$. Glass-ceramics which have a negligible temperature dependence of the resonance frequency $\tau_f$ in the GHz range are not known.

BRIEF SUMMARY OF THE INVENTION

It is therefore an object of the invention to provide glass-ceramics which should have a negligible temperature dependence of the resonance frequency $\tau_f$ in the GHz spectral range, preferably $\tau_f \approx 0$ ppm/K with only a small deviation. A further object of the invention is to discover a process in order to produce glass-ceramics which have a negligible temperature dependence of the resonance frequency $\tau_f$ in the GHz spectral range very simply and inexpensively. The glass-ceramics should be able to be used as dielectrics for high-frequency applications and have a high relative permittivity and a low dielectric loss, in particular in the GHz spectral range.

The object is achieved by a glass-ceramic having at least two crystal phases, wherein at least one crystal phase has a positive temperature dependence of the resonance frequency $\tau_f$, at least one crystal phase has a negative temperature dependence of the resonance frequency $\tau_f$ and the glass-ceramic has a resulting temperature dependence of the resonance frequency $\tau_f$ of 0 ppm/K with a maximum deviation of +/−20 ppm/K ($\tau_f=0+/-20$ ppm/K). The maximum deviation is preferably +/−5 ppm/K and particularly preferably only +/−1 ppm/K.

Glass-ceramics which have at least two crystal phases and in which at least one crystal phase has a positive temperature dependence of the resonance frequency $\tau_f$ in the GHz spectral range and at least one further crystal phase has a negative temperature dependence of the resonance frequency $\tau_f$ in the GHz spectral range can be balanced in such a way that the glass-ceramic has a resulting, negligible temperature dependence of the resonance frequency $\tau_f$ in the GHz range. The balancing can be effected in such a way that the glass-ceramic has essentially no temperature dependence of the resonance frequency $\tau_f$ in the GHz spectral range; the temperature dependence of the resonance frequency $\tau_f$ in the GHz spectral range is thus 0 ppm/K with a maximum deviation of +/−20 ppm/K or less. Such glass-ceramics have a variety of possible uses, e.g. in appliances for mobile satellite communications.

The glass-ceramic preferably has at least the following constituents (in mol % on an oxide basis):

| | |
|---|---|
| SiO$_2$ | 5-50 |
| Al$_2$O$_3$ | 0-20 |
| B$_2$O$_3$ | 0-25 |
| BaO | 0-25 |
| TiO$_2$ | 10-60 |
| RE$_2$O$_3$ | 5-45, | where Ba can be partly, preferably to an extent of up to 10%, replaced by Sr, Ca, Mg, where RE is lanthanum, another lanthanide or yttrium and where Ti can be partly, preferably to an extent of up to 10%, replaced by Zr, Hf, Y, Nb, V, Ta, Mn, Cr.

The glass-ceramic particularly preferably has at least the following constituents (in mol % on an oxide basis):

| | |
|---|---|
| SiO$_2$ | 10-40 |
| Al$_2$O$_3$ | 0-10 |
| B$_2$O$_3$ | 5-25 |
| BaO | 0-20 |
| TiO$_2$ | 15-50 |
| RE$_2$O$_3$ | 10-45, | where Ba can be partly, preferably to an extent of up to 10%, replaced by Sr, Ca, Mg, where RE is lanthanum, another lanthanide or yttrium and where Ti can be partly, preferably to an extent of up to 10%, replaced by Zr, Hf, Y, Nb, V, Ta, Mn, Cr.

Furthermore, the glass-ceramic can contain refining agents in customary amounts, preferably from 0.01 to 3 mol % of a refining agent which is preferably selected from the group consisting of Sb$_2$O$_3$ and As$_2$O$_3$.

The glass-ceramic of the invention preferably has a dielectric loss (tan δ) of not more than $10^{-2}$, preferably not more than $10^{-3}$, in high-frequency applications (f>200 MHz).

Furthermore, the glass-ceramic preferably has a relative permittivity $\in$ of at least 15, preferably >18, preferably in the range from 20 to 80.

In a further advantageous embodiment of the invention, the glass-ceramic of the invention has at least one mixed crystal phase based on RE, Ti, Si, O and optionally Ba, where Ba can be at least partly replaced by Sr, Ca, Mg, where RE is a lanthanide or yttrium and where Ti can be at least partly replaced by Zr, Hf, Y, Nb, V, Ta, Mn, Cr.

In particular, the glass-ceramic of the invention can contain at least one mixed crystal phase selected from the group consisting of mixed crystals based on Ba, RE, TiO, RE$_2$Ti$_2$O$_7$, RE$_2$Ti$_2$SiO$_9$ and RE$_4$Ti$_9$O$_{24}$, where RE is lanthanum, another lanthanide or yttrium, where up to 10% of Ba can be replaced by Sr, Ca, Mg and where up to 10% of Ti can be replaced by Zr, Hf, Y, Nb, V, Ta, Mn, Cr.

The glass-ceramic of the invention can preferably have a proportion of crystalline material of at least 30% by volume, preferably up to 95% by volume.

The average crystallite size of the crystal phases is preferably from 10 nm to 50 μm and is preferably in the range from 100 nm to 1 μm.

The glass-ceramic of the invention is particularly suitable as dielectric for a dielectric resonator, an electronic frequency filter element or an antenna element in the high-frequency range (f>200 MHz).

A particularly suitable use is that as dielectric for a cylindrical antenna element or a patch antenna element.

Furthermore, the object is achieved by the following process:

A process for producing a glass-ceramic having at least two crystal phases, which comprises at least the following steps:
production of a starting glass,
ceramicization of the starting glass to give at least one crystal phase which has a positive temperature dependence of the resonance frequency $\tau_f$ and to give a crystal phase which has a negative temperature dependence of the resonance frequency $\tau_f$,
setting of the ceramicization times and the ceramicization temperatures so that the glass-ceramic has a resulting temperature dependence of the resonance frequency $\tau_f$ of 0+/−20 ppm/K.

The starting glass is preferably obtained by means of melting, homogenization and shaping and contains at least the constituents (in mol % on an oxide basis):

| | |
|---|---|
| SiO$_2$ | 5-50 |
| Al$_2$O$_3$ | 0-20 |
| B$_2$O$_3$ | 0-25 |
| BaO | 0-25 |
| TiO$_2$ | 10-60 |
| RE$_2$O$_3$ | 5-45, | where Ba can be partly, preferably to an extent of up to 10%, replaced by Sr, Ca, Mg, where RE is lanthanum, another lanthanide or yttrium and where Ti can be partly, preferably to an extent of up to 10%, replaced by Zr, Hf, Y, Nb, V, Ta, Mn, Cr.

The starting glass particularly preferably has at least the following constituents (in mol % on an oxide basis):

| | |
|---|---|
| $SiO_2$ | 10-40 |
| $Al_2O_3$ | 0-10 |
| $B_2O_3$ | 5-25 |
| BaO | 0-20 |
| $TiO_2$ | 15-50 |
| $RE_2O_3$ | 10-45, | where Ba can be partly, preferably to an extent of up to 10%, replaced by Sr, Ca, Mg, where RE is lanthanum, another lanthanide or yttrium and where Ti can be partly, preferably to an extent of up to 10%, replaced by Zr, Hf, Y, Nb, V, Ta, Mn, Cr.

The starting glass can be brought to near net shape by known melt-technological processes.

DETAILED DESCRIPTION OF THE INVENTION

Figure 1:
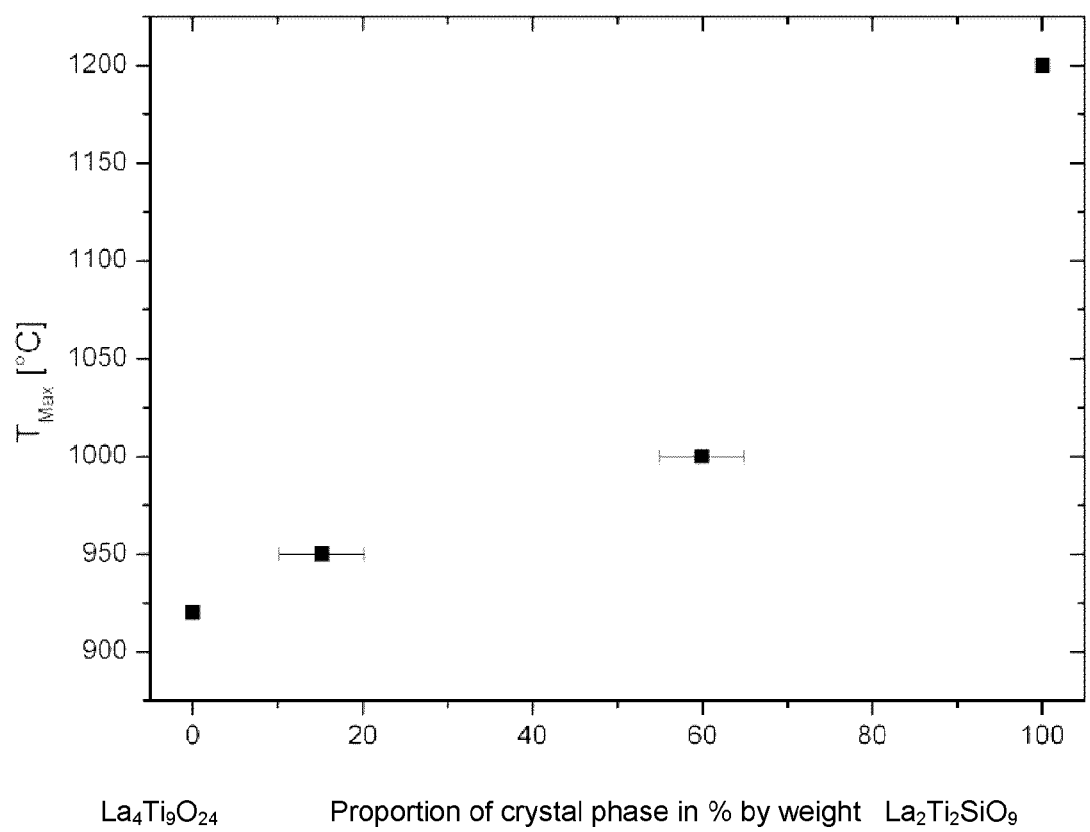
FIG. 1 shows the proportion in % by weight of the crystal phase $La_2Ti_2SiO_9$ of the glass-ceramic as a function of the maximum ceramicization temperature $T_{max}$.

It has been found that such a glass composition makes it possible to melt homogeneous starting glasses which can subsequently be converted by a ceramicizing treatment into a homogeneous glass-ceramic. The glass-ceramic has a high relative permittivity, a low dielectric loss and a low temperature dependence of the resonance frequency. The glass-ceramic of the invention can be produced in a simple and inexpensive way and allows near net shape forming by melt-technological processes, in particular by casting or optionally by pressing.

For the purposes of the present patent application, the term "glass-ceramic" refers to a material which is obtained by converting a homogeneous, melt-technologically produced starting glass by means of a targeted heat treatment into a partially crystalline body in which a multiplicity of crystallites are essentially homogeneously distributed in a vitreous matrix phase.

A glass-ceramic according to the invention as dielectric having a dielectric loss of not more than $10^{-2}$ in the high-frequency range can be produced by means of the following steps:

melting and homogenization of a starting glass containing the constituents (in mol percent on an oxide basis):

| | |
|---|---|
| $SiO_2$ | 5-50 |
| $Al_2O_3$ | 0-20 |
| $B_2O_3$ | 0-25 |
| BaO | 0-25 |
| $TiO_2$ | 10-60 |
| $RE_2O_3$ | 5-45, | where Ba can be partly, preferably to an extent of up to 10%, replaced by Sr, Ca, Mg, where RE is lanthanum or yttrium and where Ti can be partly, preferably to an extent of up to 10%, replaced by Zr, Hf, Y, Nb, V, Ta, Mn, Cr;

pouring of the starting glass into a desired mold;

cooling of the starting glass to room temperature;

ceramicization of the starting glass to give at least one crystal phase which has a positive temperature dependence of the resonance frequency $\tau_f$ and to give at least one crystal phase which has a negative temperature dependence of the resonance frequency $\tau_f$;

setting of the ceramicization times and the ceramicization temperatures so that the glass-ceramic has a resulting temperature dependence of the resonance frequency $\tau_f$ of 0+/−20 ppm/K. The deviation is preferably +/−5 ppm/K and particularly preferably only +/−1 ppm/K.

The starting glass is preferably brought to near net shape by means of a hot forming process, in particular by casting, tube drawing, rod drawing or extrusion.

EXAMPLES

Glass-ceramics according to the invention were produced as follows.

Starting glasses as described by way of example below and shown in table 4 were produced. The two crystal phases of the glass-ceramic were crystallized out at two different temperatures during the ceramicization of the respective starting glass (for starting glass compositions, see table 1 and table 4) in order to obtain $\tau_f=0+/−20$ ppm/K. This occurred essentially by adaptation of the ceramicization temperature. The two crystal phases $La_4Ti_9O_{24}$ and $La_2Ti_2SiO_9$ crystallize at different temperatures in the La—Ti—Si—O glass-ceramic system. At low ceramicization temperatures, the crystal phase $La_4Ti_9O_{24}$ was obtained, while at higher temperatures the crystal phase $La_2Ti_2SiO_9$ was obtained. A glass-ceramic having the crystal phase $La_4Ti_9O_{24}$ has a $\tau_f$ of −13 ppm/K; a glass-ceramic having the crystal phase $La_2Ti_2SiO_9$, on the other hand, has a $\tau_f$ of +65 ppm/K. Ceramicization at intermediate temperatures at which both crystal phases crystallize out led to a glass-ceramic having both crystal phases and a $\tau_f$ of 0 ppm/K with a maximum deviation of +/−20 ppm/K.

To produce such glass-ceramics, suitable raw materials customary for producing starting glasses, e.g. oxides, were melted, homogenized and hot-formed by means of conventional methods. Table 1 below shows compositions of such starting glasses which were converted into glass-ceramics according to the invention or can be transformed by means of the process of the invention.

TABLE 1

| Composition component | Example 1. | | Example 2. | | Example 3. | |
|---|---|---|---|---|---|---|
| | Mol % | % by wt. | Mol % | % by wt. | Mol % | % by wt. |
| $SiO_2$ | 21.00 | 10.06 | 21.00 | 12.26 | 21.00 | 12.63 |
| $Al_2O_3$ | 6.00 | 4.88 | 6.00 | 5.94 | 6.00 | 6.12 |
| $B_2O_3$ | 12.60 | 6.99 | 12.60 | 8.52 | 18.1 | 12.61 |

TABLE 1-continued

|  | Example 1. | | Example 2. | | Example 3. | |
|---|---|---|---|---|---|---|
| Composition component | Mol % | % by wt. | Mol % | % by wt. | Mol % | % by wt. |
| $TiO_2$ | 40.20 | 25.61 | 49.34 | 38.30 | 44.84 | 35.86 |
| $La_2O_3$ | 20.10 | 52.22 | 10.96 | 34.69 | 9.96 | 32.48 |
| $Sb_2O_3$ | 0.1 | 0.23 | 0.1 | 0.28 | 0.1 | 0.29 |

In a next step, these starting glasses were ceramicized to give a glass-ceramic. Table 2 below shows typical ceramicization parameters for the conversion of the starting glasses (examples 1 and 2) into glass-ceramics according to the invention.

TABLE 2

|  | R1 | TT1 | H1 | R2 | TT2 | H2 | R3 | TT3 | H3 | R4 | TT4 |
|---|---|---|---|---|---|---|---|---|---|---|---|
| Example 1. | 300 | 700 | 7 s | 300 | 880 | 0 | 10 | 920 | 60 | FC | 500 |
| Example 2. | 300 | 700 | 7 s | 300 | 1050 | 0 | 50 | 1200 | 15 | FC | 500 |

Ri = Heating rate in [K/min],
TTi = Target temperature in [° C.],
Hi = Hold time [min],
FC = Furnace cooling, i.e. cooling at the cooling rate typical of the respective ceramicization furnace on switching off the furnace heating.

Depending on the ceramicization parameters, in particular the maximum temperature (see TT3 in table 2), the following ratio as shown in table 3 of the two crystal phases $La_4Ti_9O_{24}$ and $La_2Ti_2SiO_9$ and $TiO_2$ (rutile) is obtained (see also FIG. 1).

TABLE 3

| Program | $T_{max}$ [° C.] | $La_4Ti_9O_{24}$ | $La_2Ti_2SiO_9$ | $TiO_9$ |
|---|---|---|---|---|
| 1 | 920 | 100 | 0 | 0 |
| 2 | 950 | 84.8 | 15.2 | 0 |
| 3 | 1000 | 40.4 | 51.2 | 8.4 |
| 4 | 1200 | 0 | 89.5 | 10.5 |

FIG. 1 shows the proportion in % by weight of the crystal phase $La_2Ti_2SiO_9$ of the glass-ceramic as a function of the maximum ceramicization temperature $T_{max}$.

A cylindrical glass-ceramic body (height 4 mm, diameter 10 mm) was produced from the glass-ceramic obtained in this way.

Figure 2:
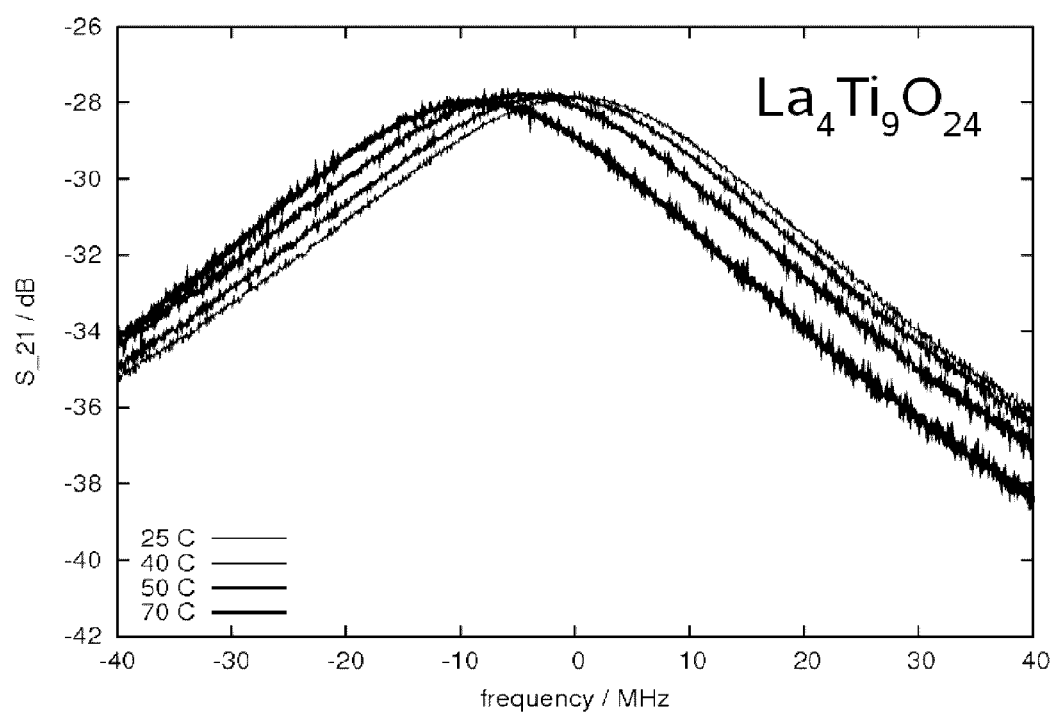
FIG. 2 shows the temperature shift of the TE011 natural mode for a glass-ceramic containing only $La_4Ti_9O_{24}$ as crystal phase.
Figure 3:
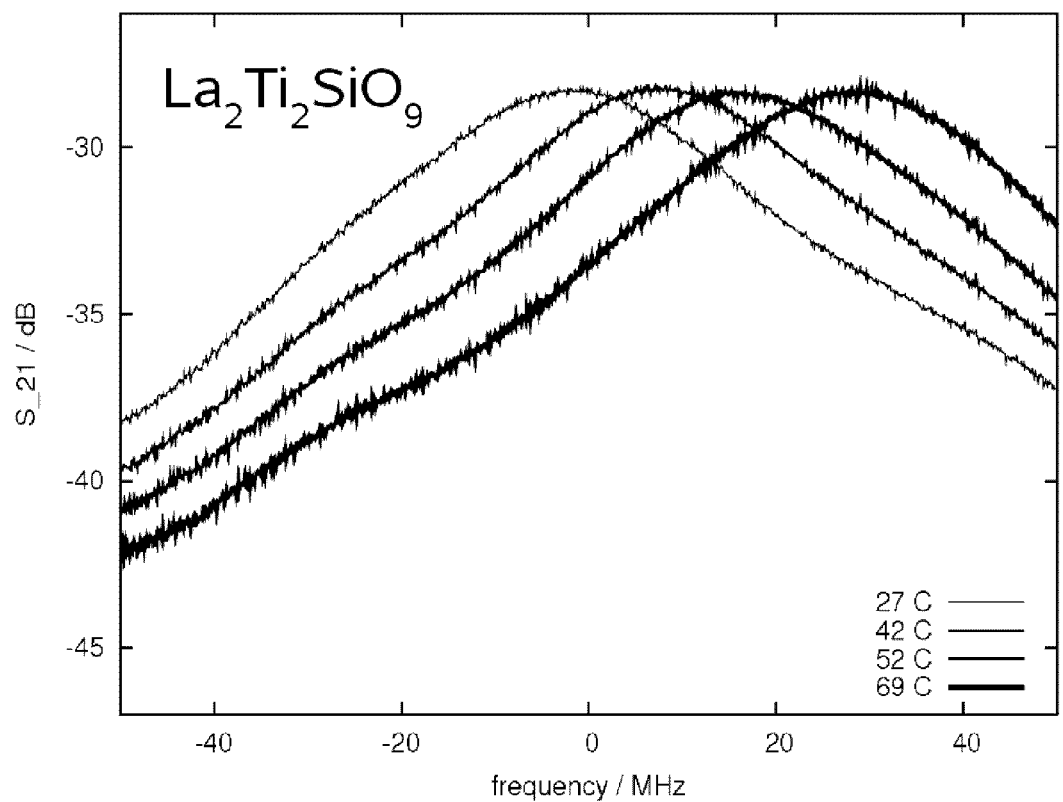
FIG. 3 shows the temperature shift of the TE011 natural mode for a glass-ceramic containing only $La_2Ti_2SiO_9$ as crystal phase.

The natural resonance of the glass-ceramic cylinder between two metal plates was determined by means of the Hakki-Coleman method. Knowledge of the natural resonance allows the dielectric constant of the glass-ceramic to be determined. The spread of the natural mode is a measure of the Q factor of the glass-ceramic. To determine the dielectric properties, the TE011 mode was used. The temperature was measured by means of a Peltier element under the glass-ceramic cylinder and a hot air blower above the glass-ceramic cylinder. The temperature of the specimen was determined by means of a pyrometer and the temperature homogeneity was monitored by means of a heat image camera. $\tau_f$ could be determined in this way. FIG. 2 and FIG. 3 show the temperature shift of the TE011 natural mode for two glass-ceramics containing only $La_2Ti_9O_{24}$ and only $La_2Ti_2SiO_9$ as crystal phase.

FIG. 2 shows a glass-ceramic containing only $La_4Ti_9O_{24}$ as crystal phase. The shift in the resonance frequency of the TE011 resonance mode as a function of the temperature is plotted in FIG. 2. The y axis shows, on a logarithmic scale, the intensity of the resonance which was measured in the network analyzer and is denoted by S21. With increasing temperature, the resonance shifts to lower frequencies, giving a negative $\tau_f$ of −13 ppm/K.

FIG. 3 shows a glass-ceramic containing only $La_2Ti_2SiO_9$ as crystal phase. The shift in the resonance frequency of the TE011 mode is likewise plotted as a function of the temperature. With increasing temperature, the resonance shifts to higher frequencies, giving a positive $\tau_f$ of +66 ppm/K.

A suitable choice of the ceramicization parameters, in particular the ceramicization time and temperature, makes it possible to set and balance $\tau_f$ and obtain glass-ceramics having $\tau_f$=0+/−20 ppm/K.

Table 4 shows various glass compositions for starting glasses in the system Ba—La—Ti—Si—O.

The various glass samples according to examples 4 to 12 were firstly melted and homogenized in a conventional way using conventional starting materials, with preference being given to using platinum crucibles, crucibles made of platinum alloys, fused silica crucibles or aluminum oxide crucibles. The samples are firstly melted at 1350° C. for 2 hours, then refined at 1400° C. for 30 minutes, stirred and homogenized by means of a platinum stirrer for 20 minutes, allowed to stand for 10 minutes and then poured into suitable molds made of, for example, steel, graphite, aluminum oxide or fused silica and thus brought to near net shape.

After cooling to room temperature, the starting glass was subjected to ceramicization, which can be carried out, for example, by means of an infrared heating process or by means of a conventional process.

If necessary, the shaped bodies can be worked further after casting by means of a grinding or polishing treatment or, in the case of the production of cylindrical bodies, by centerless cylindrical grinding.

The proportion by volume of the crystalline phase for specimen 12 is in the order of from about 50 to 70% by volume.

Relative permittivities ∈ which were all greater than 15 and lay in the range from 20 to 50 were measured on samples 4 to 12.

The samples also display a low dielectric loss and a high quality.

The quality was measured by the resonance method of Hakki-Coleman. Here, the quality factor is determined as the product of quality Q and measurement frequency $f_0$.

All samples 4 to 12 had a quality factor $Q \cdot f_0$ in the range from 2000 to 3000 GHz. In the case of specimen 4, a relative permittivity ∈ of 22.4 and a quality Q of 205, i.e. a quality factor of 2068, were measured at 10.09 GHz.

The temperature dependence of the resonance frequency $\tau_f$ is very low and is in the region of $\tau_f$=0+/−1 ppm/K for all samples measured.

In applications as dielectric for antennae which are particularly suitable as mobile GPS antennae for cell phones, the frequency range is above 200 MHz, in particular in the range from about 800 MHz to 70 GHz. The dielectric charging of the antenna reduces the sensitivity of the antenna to detuning by the user.

TABLE 4

| Component of the composition | Sample number | | | | | | | | |
|---|---|---|---|---|---|---|---|---|---|
| | 4 Content in mol % | 5 Content in mol % | 6 Content in mol % | 7 Content in mol % | 8 Content in mol % | 9 Content in mol % | 10 Content in mol % | 11 Content in mol % | 12 Content in mol % |
| $SiO_2$ | 21.00 | 23.00 | 27.00 | 19.00 | 23.00 | 19.00 | 27.00 | 21.00 | 21.00 |
| $Al_2O_3$ | 6.00 | 4.00 | 2.00 | 2.00 | 2.00 | 4.00 | 2.00 | 4.00 | 6.00 |
| $B_2O_3$ | 12.60 | 10.50 | 10.50 | 14.50 | 12.50 | 12.50 | 10.50 | 10.50 | 12.60 |
| BaO | 0.00 | 14.75 | 14.25 | 15.25 | 14.75 | 15.25 | 14.25 | 15.25 | 0.00 |
| $TiO_2$ | 40.20 | 34.90 | 33.90 | 35.90 | 34.90 | 35.90 | 33.90 | 35.90 | 40.20 |
| $Sb_2O_3$ | 0.10 | 0.10 | 0.10 | 0.10 | 0.10 | 0.10 | 0.10 | 0.10 | 0.10 |
| $La_2O_3$ | 20.10 | 12.75 | 12.25 | 13.25 | 12.75 | 13.25 | 12.25 | 13.25 | 20.10 |
| Total | 100.0 | 100.0 | 100.0 | 100.0 | 100.0 | 100.0 | 100.0 | 100.0 | 100.0 |

The invention claimed is:

1. A glass-ceramic having at least two crystal phases, wherein at least one crystal phase has a positive temperature dependence of the resonance frequency $\tau_f$, at least one crystal phase has a negative temperature dependence of the resonance frequency $\tau_f$ and the glass-ceramic has a resulting temperature dependence of the resonance frequency $\tau_f$ of 0+/−20 ppm/K, and
wherein the glass-ceramic has at least the following constituents (in mol % on an oxide basis):

| | |
|---|---|
| $SiO_2$ | 5-50 |
| $Al_2O_3$ | 0-20 |
| $B_2O_3$ | 0-25 |
| BaO | 0-25 |
| $TiO_2$ | 10-60 |
| $RE_2O_3$ | 5-45, | where Ba can be partly replaced by Sr, Ca, and Mg, where RE is lanthanum, another lanthanide or yttrium and where Ti can be partly replaced by Zr, Hf, Y, Nb, V, Ta, Mn, and Cr.

2. The glass-ceramic according to claim 1 wherein the glass-ceramic has a dielectric loss (tan δ) of not more than $10^{-2}$.

3. The glass-ceramic according to claim 1 wherein the glass-ceramic has a relative permittivity ∈ of at least 15.

4. The glass-ceramic according to claim 1 wherein the glass-ceramic contains at least one mixed crystal phase based on RE, Ti, Si, O and Ba, where Ba can be at least partly replaced by Sr, Ca, Mg, where RE is a lanthanide or yttrium and where Ti can be at least partly replaced by Zr, Hf, Y, Nb, V, Ta, Mn, and Cr.

5. The glass-ceramic according to claim 1 wherein the glass-ceramic contains at least one mixed crystal phase selected from the group consisting of mixed crystals based on Ba, RE, TiO, $RE_2Ti_2O_2$, $RE_2Ti_2SiO_9$ and $RE_4Ti_9O_{24}$, where RE is lanthanum, another lanthanide or yttrium, where up to 10% of Ba can be replaced by Sr, Ca, Mg and where up to 10% of Ti can be replaced by Zr, Hf, Y, Nb, V, Ta, Mn, and Cr.

6. The glass-ceramic according to claim 1 wherein the glass-ceramic has a proportion of crystalline material of at least 30% by volume.

7. The glass-ceramic according to claim 1 wherein the glass-ceramic has an average crystallite size of from 10 nanometers to 50 micrometers.

8. The glass-ceramic according to claim 1 wherein the glass ceramic is a dielectric configured for use as a device selected from the group consisting of a dielectric resonator, an electronic frequency filter element, an antenna element for the high-frequency range, a cylindrical antenna element, and a patch antenna element.

9. A glass-ceramic having at least two crystal phases, wherein at least one crystal phase has a positive temperature dependence of the resonance frequency $\tau_f$, at least one crystal phase has a negative temperature dependence of the resonance frequency $\tau_f$ and the glass-ceramic has a resulting temperature dependence of the resonance frequency $\tau_f$ of 0+/−20 ppm/K, wherein the glass-ceramic contains at least one mixed crystal phase based on RE, Ti, Si, O, and Ba, where Ba can be at least partly replaced by Sr, Ca, and Mg, where RE is a lanthanide or yttrium and where Ti can be at least partly replaced by Zr, Hf, Y, Nb, V, Ta, Mn, and Cr.

10. The glass-ceramic according to claim 9 wherein the glass-ceramic has a dielectric loss (tan δ) of not more than $10^{-2}$.

11. The glass-ceramic according to claim 9 wherein the glass-ceramic has a relative permittivity ∈ of at least 15.

12. The glass-ceramic according to claim 9 wherein the glass-ceramic has a proportion of crystalline material of at least 30% by volume.

13. The glass-ceramic according to claim 9 wherein the glass-ceramic has an average crystallite size of from 10 nanometers to 50 micrometers.

14. The glass-ceramic according to claim 9 wherein the glass ceramic is a dielectric configured for use as a device selected from the group consisting of a dielectric resonator, an electronic frequency filter element, an antenna element for the high-frequency range, a cylindrical antenna element, and a patch antenna element.

* * * * *